US012602284B2

(12) United States Patent
Waki et al.

(10) Patent No.: US 12,602,284 B2
(45) Date of Patent: Apr. 14, 2026

(54) DATA PROCESSING APPARATUS, MEMORY FAILURE DETERMINATION METHOD, AND NON-TRANSITORY COMPUTER READABLE RECORDING MEDIUM

(71) Applicant: Yokogawa Electric Corporation, Tokyo (JP)

(72) Inventors: Hayato Waki, Tokyo (JP); Shouji Igarashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/747,877

(22) Filed: Jun. 19, 2024

(65) Prior Publication Data

US 2025/0021434 A1     Jan. 16, 2025

(30) Foreign Application Priority Data

Jul. 12, 2023     (JP) ................................. 2023-114697

(51) Int. Cl.
*G06F 11/10*            (2006.01)

(52) U.S. Cl.
CPC ...... *G06F 11/1068* (2013.01); *G06F 11/1016* (2013.01)

(58) Field of Classification Search
CPC ............. G06F 11/1068; G06F 11/1016; G06F 11/2635; G11C 29/26; G11C 29/36;
(Continued)

(56) References Cited

U.S. PATENT DOCUMENTS

2011/0154152 A1*  6/2011  Brzezinski .......... G06F 11/1004
                                                                         714/763
2015/0262709 A1*  9/2015  Anzou ................. G11C 7/1006
                                                                         365/189.07
(Continued)

FOREIGN PATENT DOCUMENTS

JP          61-065562 A       4/1986
JP          2019191770 A     10/2019
WO          1986001036 A1     2/1986

OTHER PUBLICATIONS

Extended European Search Report (EESR) dated Dec. 6, 2024 issued in European patent application No. 24186291.1.
(Continued)

*Primary Examiner* — Thien Nguyen
(74) *Attorney, Agent, or Firm* — RANKIN, HILL & CLARK LLP

(57)            ABSTRACT

In a data processing apparatus 11, a buffer memory BM including a first buffer memory RM1, a second buffer memory MM1, a third buffer memory RM2, and a fourth buffer memory MM2, stores therein data that is formed of a plurality of bits, and a CPU 11A reads the data from the buffer memory BM, performs bit inversion on the plurality of bits to generate bit inverted data in which a value of each of the bits is inverted, writes the bit inverted data in the buffer memory BM at a first time, reads the data from the buffer memory BM at a second time that is later than the first time, compares first data that is bit inverted data that is written in the buffer memory BM at the first time and second data that is bit inverted data that is read from the buffer memory BM at the second time, and determines presence of a failure in the buffer memory BM.

6 Claims, 7 Drawing Sheets

1

(58) Field of Classification Search
CPC ............ G11C 29/44; G11C 2029/0401; G11C
2029/0409; G11C 2029/3602; G11C
29/10; G11C 29/38; G11C 29/56
See application file for complete search history.

(56) References Cited

U.S. PATENT DOCUMENTS

| | | | |
|---|---|---|---|
| 2019/0324835 A1 | 10/2019 | Igarashi et al. | |
| 2022/0398158 A1* | 12/2022 | Vaassen | G06F 11/141 |

OTHER PUBLICATIONS

Japanese Office Action dated Feb. 17, 2026 and issued for Japanese patent application No. 2023-114697 and its English machine translation.

* cited by examiner

FIG.3

| n-TH DETECTED DATA | EIGHTH BIT (MSB) | SEVENTH BIT | SIXTH BIT | FIFTH BIT | FOURTH BIT | THIRD BIT | SECOND BIT | FIRST BIT (LSB) |
|---|---|---|---|---|---|---|---|---|
|  | 0 | 0 | 0 | 0 | 1 | 1 | 1 | 1 |

FIG.4

| n-TH INVERTED DATA | EIGHTH BIT (MSB) | SEVENTH BIT | SIXTH BIT | FIFTH BIT | FOURTH BIT | THIRD BIT | SECOND BIT | FIRST BIT (LSB) |
|---|---|---|---|---|---|---|---|---|
| | 1 | 1 | 1 | 1 | 0 | 0 | 0 | 0 |

FIG.6

| FIRST FIXED DATA | EIGHTH BIT (MSB) | SEVENTH BIT | SIXTH BIT | FIFTH BIT | FOURTH BIT | THIRD BIT | SECOND BIT | FIRST BIT (LSB) |
|---|---|---|---|---|---|---|---|---|
| | 1 | 0 | 1 | 0 | 1 | 0 | 1 | 0 |

FIG.7

| SECOND FIXED DATA | EIGHTH BIT (MSB) | SEVENTH BIT | SIXTH BIT | FIFTH BIT | FOURTH BIT | THIRD BIT | SECOND BIT | FIRST BIT (LSB) |
|---|---|---|---|---|---|---|---|---|
| | 0 | 1 | 0 | 1 | 0 | 1 | 0 | 1 |

1

DATA PROCESSING APPARATUS, MEMORY FAILURE DETERMINATION METHOD, AND NON-TRANSITORY COMPUTER READABLE RECORDING MEDIUM

CROSS-REFERENCE TO RELATED APPLICATION

The present application claims priority to and incorporates by reference the entire contents of Japanese Patent Application No. 2023-114697 filed in Japan on Jul. 12, 2023.

FIELD

The present disclosure relates to a data processing apparatus, a memory failure determination method, and a non-transitory computer readable recording medium having stored therein a memory failure determination program.

BACKGROUND

In some cases, data (hereinafter, may be referred to as "detected data") that indicates a value (hereinafter, may be referred to as a "detected value") that is detected by a detector may be temporarily stored in a memory in a Field-Programmable Gate Array (FPGA) that is included in a data processing apparatus connected to the detector.

Example of related-art is described in Japanese Laid-open Patent Publication No. 2019-191770.

However, a failure easily occurs in the memory in the FPGA, and therefore, when a failure occurs in the memory, it may be difficult to provide a correct detected value to an operator of the detector.

To cope with this, the present disclosure proposes a technology for accurately determining presence of a failure in a memory.

SUMMARY

According to an aspect of an embodiment, a data processing apparatus includes a memory and a processor. The memory stores therein data that is formed of a plurality of bits. The processor reads the data from the memory, performs bit inversion on the plurality of bits to generate bit inverted data in which a value of each of the bits is inverted, writes the bit inverted data in the memory at a first time, reads the bit inverted data from the memory at a second time that is later than the first time, compares first data that is the bit inverted data that is written in the memory at the first time and second data that is the bit inverted data that is read from the memory at the second time, and determines whether a failure is present in the memory.

BRIEF DESCRIPTION OF THE DRAWINGS

FIG. 3 is a diagram illustrating an example of bit inversion according to one embodiment of the present disclosure;

FIG. 4 is a diagram illustrating an example of the bit inversion according to one embodiment of the present disclosure;

2

Figure 5:
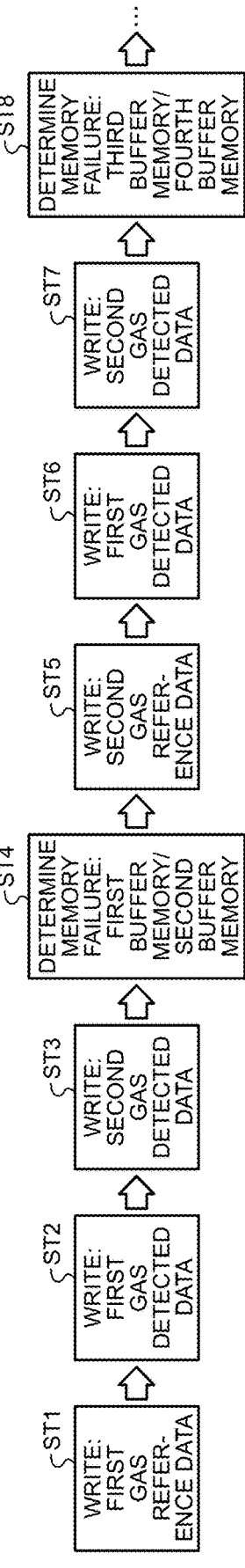

FIG. 5 is a diagram illustrating an example of the flow of a process in the substance detection system according to one embodiment of the present disclosure;

FIG. 6 is a diagram illustrating an example of fixed data according to a comparative example of the present disclosure; and FIG. 7 is a diagram illustrating an example of fixed data according to the comparative example of the present disclosure.

DESCRIPTION OF EMBODIMENTS

Embodiments of the present disclosure will be described below based on the drawings. In the embodiments below, the same components and the same processes may be denoted by the same reference symbols, and repeated explanation may be omitted.

<Configuration of Substance Detection System>

Figure 1:
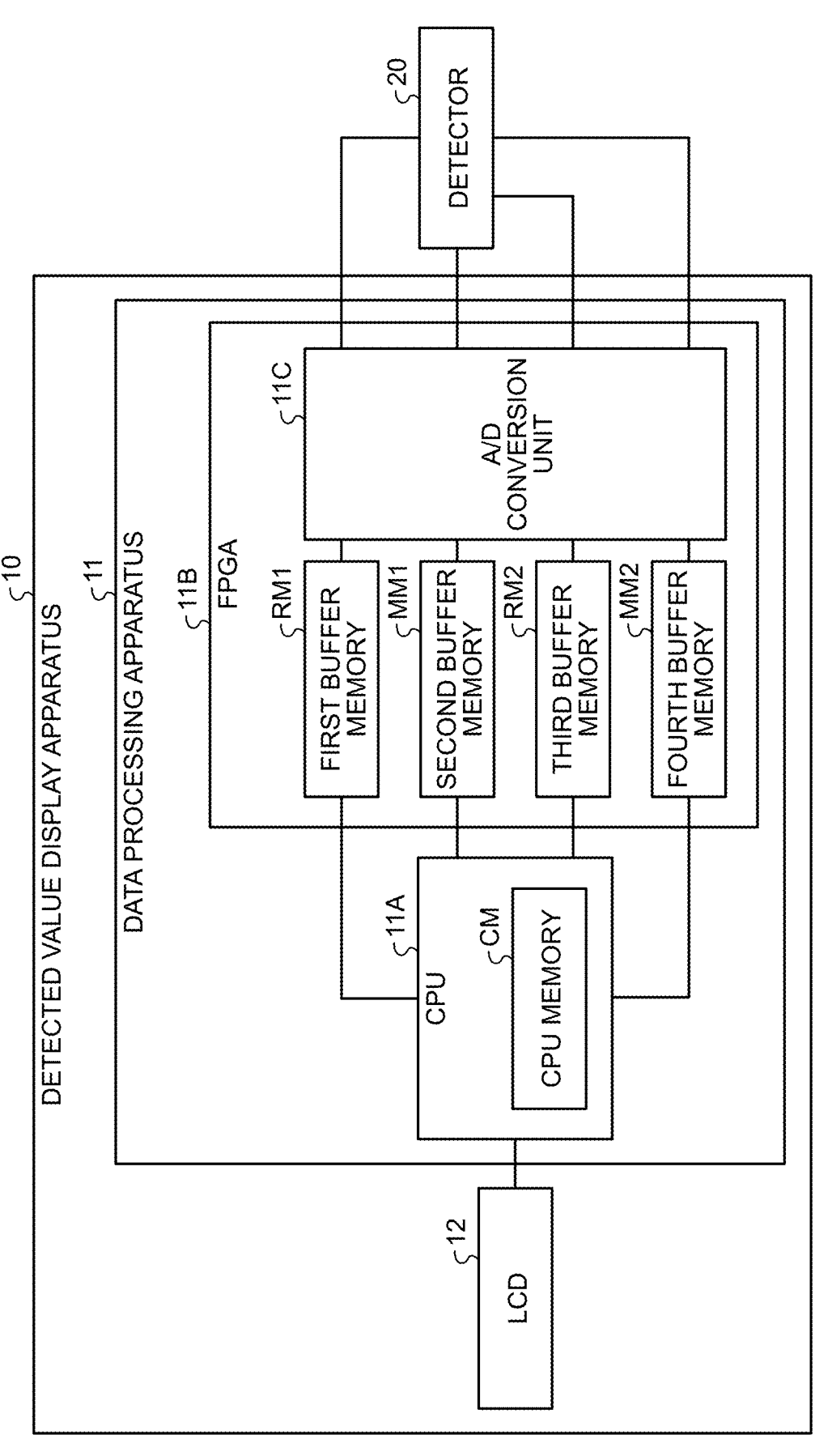
FIG. 1 is a diagram illustrating a configuration example of a substance detection system according to one embodiment of the present disclosure.

FIG. 1 is a diagram illustrating a configuration example of a substance detection system according to one embodiment of the present disclosure. In FIG. 1, a substance detection system 1 includes a detected value display apparatus 10 and a detector 20. The detected value display apparatus 10 includes a data processing apparatus 11 and a Liquid Crystal Display (LCD) 12, and the data processing apparatus 11 is connected to the detector 20. The data processing apparatus 11 includes a Central Processing Unit (CPU) 11A and a Field-Programmable Gate Array (FPGA) 11B. The CPU 11A includes a CPU memory CM. The FPGA 11B includes an analog-to-digital (A/D) conversion unit 11C, a first buffer memory RM1, a second buffer memory MM1, a third buffer memory RM2, and a fourth buffer memory MM2. In the following, the first buffer memory RM1, the second buffer memory MM1, the third buffer memory RM2, and the fourth buffer memory MM2 may collectively be referred to as a "buffer memory BM".

Examples of a substance to be detected by the substance detection system 1 include gas, and examples of the detector 20 include a probe-type gas analyzer. The CPU 11A is one example of a processor. Examples of the buffer memory BM include a Random Access Memory (RAN) of a First In First out (FIFO) type. The LCD 12 is one example of a display.

The detector 20 detects an absorption spectrum of reference gas for first gas (hereinafter, may be referred to as "first reference gas"), and outputs detected data (hereinafter, may be referred to as "first gas reference data") that indicates a value of the absorption spectrum of the first reference gas to the A/D conversion unit 11C. The A/D conversion unit 11C converts analog first gas reference data to digital first gas reference data, and writes the converted digital first gas reference data in the first buffer memory RM1. The digital first gas reference data is formed of a plurality of bits (for example, 8 bits).

Further, the detector 20 detects an absorption spectrum of the first gas, and outputs detected data (hereinafter, may be referred to as "first gas detected data") that indicates a value of the absorption spectrum of the first gas to the A/D conversion unit 11C. The A/D conversion unit 11C converts analog first gas detected data to digital first gas detected data, and writes the converted digital first gas detected data in the second buffer memory MM1. The digital first gas detected data is formed of a plurality of bits (for example, 8 bits).

Furthermore, the detector 20 detects an absorption spectrum of reference gas for second gas (hereinafter, may be referred to as "second reference gas"), and outputs detected data (hereinafter, may be referred to as "second gas reference data") that indicates a value of the absorption spectrum of the second reference gas to the A/D conversion unit 11C. The A/D conversion unit 11C converts analog second gas reference data to digital second gas reference data, and writes the converted digital second gas reference data in the third buffer memory RM2. The digital second gas reference data is formed of a plurality of bits (for example, 8 bits).

Moreover, the detector 20 detects an absorption spectrum of the second gas, and outputs detected data (hereinafter, may be referred to as "second gas detected data") that indicates a value of the absorption spectrum of the second gas to the A/D conversion unit 11C. The A/D conversion unit 11C converts analog second gas detected data to digital second gas detected data, and writhes the converted digital second gas detected data in the fourth buffer memory MM2. The digital second gas detected data is formed of a plurality of bits (for example, 8 bits).

The CPU 11A reads the first gas reference data from the first buffer memory RM1 and displays a value that is indicated by the read first gas reference data on the LCD 12. Further, the CPU 11A performs bit inversion on the plurality of bits that form the first gas reference data that is read from the first buffer memory RM1, and generates data (hereinafter, may be referred to as "first reference gas inverted data") in which a value of each of the bits included in the first gas reference data is inverted. Furthermore, at a time t11, the CPU 11A writes and stores the first reference gas inverted data in the CPU memory CM and writes the first reference gas inverted data in the first buffer memory RM1. Subsequently, at a time t12 later than the time t11, the CPU 11A reads the first reference gas inverted data from the first buffer memory RM1 and reads the first reference gas inverted data from the CPU memory CM. Further, the CPU 11A compares the first reference gas inverted data that is read from the CPU memory CM at the time t12 (that is, the first reference gas inverted data that is written in the first buffer memory RM1 at the time t11) and the first reference gas inverted data that is read from the first buffer memory RM1 at the time t12, and determines whether a failure is present in the first buffer memory RM1. The CPU 11A determines that a failure is present in the first buffer memory RM1 when a value of the first reference gas inverted data that is written in the first buffer memory RM1 at the time t11 and a value of the first reference gas inverted data that is read from the first buffer memory RM1 at the time t12 are different, and determines that a failure is absent in the first buffer memory RM1 when both of the values are the same. Furthermore, when determining that a failure is present in the first buffer memory RM1, the CPU 11A displays a warning indicating that a failure is present in the first buffer memory RM1 on the LCD 12.

Moreover, the CPU 11A reads the first gas detected data from the second buffer memory MM1 and displays a value that is indicated by the read first gas detected data on the LCD 12. Furthermore, the CPU 11A performs bit inversion on the plurality of bits that form the first gas detected data that is read from the second buffer memory MM1, and generates data (hereinafter, may be referred to as "first gas inverted data") in which a value of each of the bits included in the first gas detected data is inverted. Moreover, at a time t21, the CPU 11A writes and stores the first gas inverted data in the CPU memory CM and writes the first gas inverted data in the second buffer memory MM1. Subsequently, at a time t22 later than the time t21, the CPU 11A reads the first gas inverted data from the second buffer memory MM1 and reads the first gas inverted data from the CPU memory CM. Further, the CPU 11A compares the first gas inverted data that is read from the CPU memory CM at the time t22 (that is, the first gas inverted data that is written in the second buffer memory MM1 at the time t21) and the first gas inverted data that is read from the second buffer memory MM1 at the time t22, and determines whether a failure is present in the second buffer memory MM1. The CPU 11A determines that a failure is present in the second buffer memory MM1 when a value of the first gas inverted data that is written in the second buffer memory MM1 at the time t21 and a value of the first gas inverted data that is read from the second buffer memory MM1 at the time t22 are different, and determines that a failure is absent in the second buffer memory MM1 when both of the values are the same. Furthermore, when determining that a failure is present in the second buffer memory MM1, the CPU 11A displays a warning indicating that a failure is present in the second buffer memory MM1 on the LCD 12.

Moreover, the CPU 11A reads the second gas reference data from the third buffer memory RM2 and displays a value that is indicated by the read second gas reference data on the LCD 12. Furthermore, the CPU 11A performs bit inversion on the plurality of bits that form the second gas reference data that is read from the third buffer memory RM2, and generates data (hereinafter, may be referred to as "second reference gas inverted data") in which a value of each of the bits included in the second gas reference data is inverted. Moreover, at a time t31, the CPU 11A writes and stores the second reference gas inverted data in the CPU memory CM and writes the second reference gas inverted data in the third buffer memory RM2. Subsequently, at a time t32 later than the time t31, the CPU 11A reads the second reference gas inverted data from the third buffer memory RM2 and reads the second reference gas inverted data from the CPU memory CM. Furthermore, the CPU 11A compares the second reference gas inverted data that is read from the CPU memory CM at the time t32 (that is, the second reference gas inverted data that is written in the third buffer memory RM2 at the time t31) and the second reference gas inverted data that is read from the third buffer memory RM2 at the time t32, and determines whether a failure is present in the third buffer memory RM2. The CPU 11A determines that a failure is present in the third buffer memory RM2 when a value of the second reference gas inverted data that is written in the third buffer memory RM2 at the time t31 and a value of the second reference gas inverted data that is read from the third buffer memory RM2 at the time t32 are different, and determines that a failure is absent in the third buffer memory RM2 when both of the values are the same. Moreover, when determining that a failure is present in the third buffer memory RM2, the CPU 11A displays a warning indicating that a failure is present in the third buffer memory RM2 on the LCD 12.

Furthermore, the CPU 11A reads the second gas detected data from the fourth buffer memory MM2 and displays a value that is indicated by the read second gas detected data on the LCD 12. Moreover, the CPU 11A performs bit inversion on the plurality of bits that form the second gas detected data that is read from the fourth buffer memory MM2, and generates data (hereinafter, may be referred to as "second gas inverted data") in which a value of each of the bits included in the second gas detected data is inverted. Furthermore, at a time t41, the CPU 11A writes and stores the second gas inverted data in the CPU memory CM and writes the second gas inverted data in the fourth buffer memory MM2. Subsequently, at a time t42 later than the time t41, the CPU 11A reads the second gas inverted data from the fourth buffer memory MM2 and reads the second gas inverted data from the CPU memory CM. Moreover, the CPU 11A compares the second gas inverted data that is read from the CPU memory CM at the time t42 (that is, the second gas inverted data that is written in the fourth buffer memory MM2 at the time t41) and the second gas inverted data that is read from the fourth buffer memory MM2 at the time t42, and determines whether a failure is present in the fourth buffer memory MM2. The CPU 11A determines that a failure is present in the fourth buffer memory MM2 when a value of the second gas inverted data that is written in the fourth buffer memory MM2 at the time t41 and a value of the second gas inverted data that is read from the fourth buffer memory MM2 at the time t42 are different, and determines that a failure is absent in the fourth buffer memory MM2 when both of the values are the same. Furthermore, when determining that a failure is present in the fourth buffer memory MM2, the CPU 11A displays a warning indicating that a failure is present in the fourth buffer memory MM2 on the LCD 12.

<Configuration of Buffer Memory>

Figure 2:
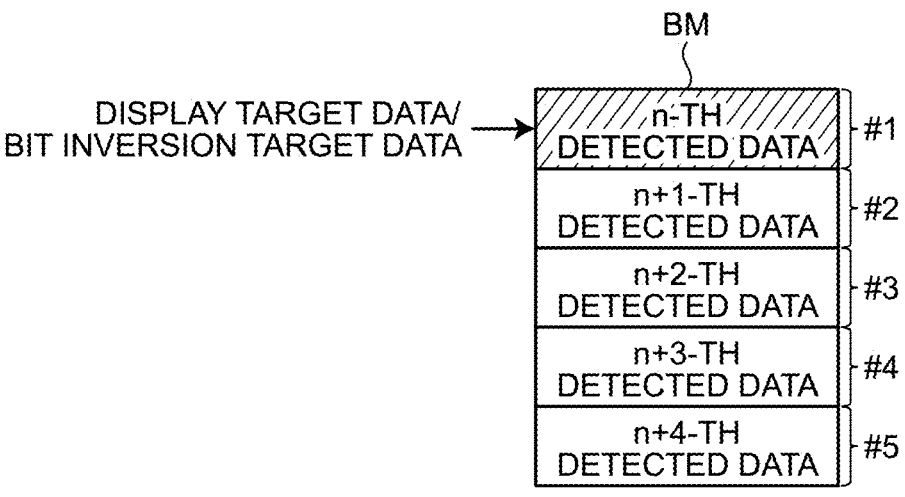
FIG. 2 is a diagram illustrating a configuration example of a buffer memory according to one embodiment of the present disclosure.

FIG. 2 is a diagram illustrating a configuration example of the buffer memory according to one embodiment of the present disclosure. FIG. 2 illustrates, as one example, a buffer memory BM of a FIFO type that includes five areas, that is, a first area #1, a second area #2, a third area #3, a fourth area #4, and a fifth area #5.

In the buffer memory BM as illustrated in FIG. 2, when detected data to be displayed on the LCD 12 (hereinafter, may be referred to as "display target data") is n-th detected data that is written in the first area #1, the CPU 11A reads the n-th detected data that is written in the first area #1 as display target data and as detected data to be subjected to bit inversion (hereinafter, may be referred to as "bit inversion target data") from the buffer memory BM.

Subsequently, the CPU 11A writes the n-th detected data that is read from the buffer memory BM, as the display target data, in the area #A in the CPU memory CM.

Further, the CPU 11A performs bit inversion on a plurality of bits that form the n-th detected data that is read from the buffer memory BM, and writes bit-inverted data (hereinafter, may be referred to as "n-th inverted data") in the area #B in the CPU memory CM and in the first area #1 of the buffer memory BM.

Subsequently, the CPU 11A reads the n-th inverted data from the first area #1 in the buffer memory BM.

Further, the CPU 11A determines whether the n-th inverted data that is written in the area #B in the CPU memory CM and the n-th inverted data that is read from the first area #1 in the buffer memory BM are different, and determines whether a memory error is present in the first area #1 in the buffer memory BM.

Thereafter, the CPU 11A determines whether a memory error is present in each of the areas, that is, the second area #2, the third area #3, the fourth area #4, and the fifth area #5 in the buffer memory BM in the same manner as the first area #1.

<Bit Inversion>

FIG. 3 and FIG. 4 are diagrams illustrating an example of bit inversion according to one embodiment of the present disclosure. As illustrated in FIG. 3, for example, when the n-th detected data is 8-bit data of "00001111", the CPU 11A inverts a value of each of the bits that form the n-th detected data, and generates n-th inverted data that is 8-bit data of "11110000" as illustrated in FIG. 4.

<Flow of Process>

FIG. 5 is a diagram illustrating an example of the flow of a process in the substance detection system according to one embodiment of the present disclosure.

In FIG. 5, at Step ST1, the detector 20 writes the first gas reference data in the first buffer memory RM1.

Subsequently, at Step ST2, the detector 20 detects the absorption spectrum of the first gas and writes the first gas detected data in the second buffer memory MM1.

Then, at Step ST3, the detector 20 detects the absorption spectrum of the second gas and writes the second gas detected data in the fourth buffer memory MM2.

Subsequently, at Step ST4, the CPU 11A determines whether a failure is present in the first buffer memory RM1 and the second buffer memory MM1 in the manner as described above.

Then, at Step ST5, the detector 20 writes the second gas reference data in the third buffer memory RM2.

Subsequently, at Step ST6, the detector 20 detects the absorption spectrum of the first gas and writes the first gas detected data in the second buffer memory MM1.

Then, at Step ST7, the detector 20 detects the absorption spectrum of the second gas and writes the second gas detected data in the fourth buffer memory MM2.

Subsequently, at Step ST8, the CPU 11A determines whether a failure is present in the third buffer memory RM2 and the fourth buffer memory MM2 in the manner as described above.

As described above, immediately after the detector 20 writes the first gas detected data in the second buffer memory MM1 at Step ST2 and writes the second gas detected data in the fourth buffer memory MM2 at Step ST3, the CPU 11A determines whether a failure is present in the first buffer memory RM1 and the second buffer memory MM1 at Step ST4. Further, immediately after the detector 20 writes the first gas detected data in the second buffer memory MM1 at Step ST6 and writes the second gas detected data in the fourth buffer memory MM2 at Step ST7, the CPU 11A determines whether a failure is present in the third buffer memory RM2 and the fourth buffer memory MM2 at Step ST8.

After the process at Step ST8, the processes from Step ST1 to Step ST8 is adopted as one cycle, and the processes from Step ST1 to Step ST8 are repeated.

COMPARISON EXAMPLE

In the embodiment of the present disclosure as described above, to determine whether a failure is present in the buffer memory BM, data (hereinafter, may be referred to as "bit inverted data") in which a value of each of bits that form data is inverted is used.

As a mode of the failure in the buffer memory BM, a failure in which a bit value is fixed to "0" (hereinafter, may be referred to as "0-fixed failure") and a failure in which a bit value is fixed to "1" (hereinafter, may be referred to as "1-fixed failure") are known.

As in the embodiment as described above, by writing the single piece of bit inverted data once and reading the single piece of bit inverted data once with respect to a single area in the buffer memory BM, it is possible to detect both of the 0-fixed failure and the 1-fixed failure in the single area.

In contrast, it may be possible to adopt a comparison example in which presence of a failure in the buffer memory BM is determined by using data in which a bit value is fixed in advance (hereinafter, may be referred to as "fixed data"), instead of using the bit inverted data. FIG. 6 and FIG. 7 are diagrams illustrating an example of fixed data according to a comparative example according to the present disclosure. In the comparative example, when first fixed data with an 8-bit value of "10101010" as illustrated in FIG. 6 is to be used, second fixed data with an 8-bit value of "01010101", in which bit values of the first fixed data are inverted as illustrated in FIG. 7 is needed. In other words, in the comparative example, to detect both of the 0-fixed failure and the 1-fixed failure in a single area that is a failure determination target in the buffer memory BM, it is needed to write the first fixed data once and read the first fixed data once with respect to the single area, and it is also needed to write the second fixed data once and read the second fixed data once with respect to the single area.

As described above, with use of the bit inverted data for determination of presence of a failure in the buffer memory BM, it is possible to reduce the number of times of write and read with respect to the buffer memory BM by half as compared to a case in which the fixed data is used, so that it is possible to efficiently determine whether a failure is present in the buffer memory BM.

Thus, the embodiment and the comparative example of the present disclosure have been described above.

Meanwhile, in the embodiment as described above, the case has been described as an example in which gas is adopted as a detection target substance of the substance detection system 1. However, even in a case in which the detection target substance of the substance detection system 1 is a substance other than gas, it is possible to apply the technology of the present disclosure.

Furthermore, in the embodiment as described above, the case has been described as an example in which the single detector 20 is connected to the single data processing apparatus 11. However, even in a case in which the plurality of detectors 20 are connected to the single data processing apparatus 11, it is possible to apply the technology of the present disclosure.

Moreover, all or a part of the processes performed by the data processing apparatus 11 as described above may be implemented by causing the CPU 11A to execute a program that corresponds to each of the processes. For example, a program that corresponds to each of the processes as described above may be stored in a memory or a storage included in the data processing apparatus 11, and the CPU 11A may read the programs from the memory or the storage and execute the programs. Furthermore, the programs may be stored in a program server that is connected to the data processing apparatus 11 via an arbitrary network and may be executed by being downloaded from the program server by the data processing apparatus 11, or the programs may be stored in a recording medium that the data processing apparatus 11 can read and may be executed by being read from the recording medium. Examples of the recording medium that the data processing apparatus 11 can read include a portable storage medium, such as a memory card, a Universal Serial Bus (USB) memory, a Secure Digital (SD) card, a flexible disk, a magneto-optical disk, a compact disc-ROM (CD-ROM), and a digital versatile disk (DVD).

As described above, the data processing apparatus according to the present disclosure (the data processing apparatus 11 of the embodiment) includes a memory (the buffer memory BM of the embodiment) and a processor (the CPU 11A of the embodiment). The memory stores therein data that is formed of a plurality of bits. The processor reads the data from the memory, and performs bit inversion on the plurality of bits to generate bit inverted data in which values of each of the bits is inverted. Further, the processor writes the bit inverted data in the memory at a first time, and reads the bit inverted data from the memory at a second time that is later than the first time. Furthermore, the processor compares first data that is the bit inverted data that is written in the memory at the first time and second data that is the bit inverted data that is read from the memory at a second time, and determines whether a failure is present of the memory.

For example, the processor determines that a failure is absent in the memory when a value of the first data and a value of the second data are the same, and determines that a failure is present in the memory when the value of the first data and the value of the second data are different.

Furthermore, for example, the data processing apparatus according to the present disclosure includes an FPGA (the FPGA 11B of the embodiment) that includes the memory.

Moreover, for example, the data that is stored in the memory is detected data that indicates a value detected by a detector that is connected to the data processing apparatus.

With the configuration as described above, it is possible to accurately determine presence of a failure in the memory.

According to the present disclosure, it is possible to accurately determine presence of a failure in a memory.

Further, some examples of combinations in the technology of the present disclosure will be described below.

(1) A data processing apparatus including:
a memory that stores therein data that is formed of a plurality of bits; and
a processor that
reads the data from the memory,
performs bit inversion on the plurality of bits to generate bit inverted data in which a value of each of the bits is inverted,
writes the bit inverted data in the memory at a first time,
reads the bit inverted data from the memory at a second time that is later than the first time,
compares first data that is the bit inverted data that is written in the memory at the first time and second data that is the bit inverted data that is read from the memory at the second time, and
determines whether a failure is present in the memory.

(2) The data processing apparatus according to (1), wherein the processor determines that a failure is absent in the memory when a value of the first data and a value of the second data are the same, and determines that a failure is present in the memory when the value of the first data and the value of the second data are different.

(3) The data processing apparatus according to (1) or (2), further including a Field-Programmable Gate Array (FPGA) that includes the memory.

(4) The data processing apparatus according to any of (1) to (3), wherein the data is detected data that indicates a value detected by a detector that is connected to the data processing apparatus.

(5) A memory failure determination method implemented by a processor, the memory failure determination method including:
reading data that is formed of a plurality of bits from a memory;
performing bit inversion on the plurality of bits to generate bit inverted data in which a value of each of the bits is inverted;
writing the bit inverted data in the memory at a first time;
reading the bit inverted data from the memory at a second time that is later than the first time;
comparing first data and second data, the first data being the bit inverted data that is written in the memory at the first time, the second data being the bit inverted data that is read from the memory at the second time; and determining whether a failure is present in the memory.

(6) A memory failure determination program that causes a computer to execute a process, the process including:

reading data that is formed of a plurality of bits from a memory;

performing bit inversion on the plurality of bits to generate bit inverted data in which a value of each of the bits is inverted;

writing the bit inverted data in the memory at a first time;

reading the bit inverted data from the memory at a second time that is later than the first time;

comparing first data and second data, the first data being the bit inverted data that is written in the memory at the first time, the second data being the bit inverted data that is read from the memory at the second time; and determining whether a failure is present in the memory.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing apparatus comprising:

a first memory in a central processing unit (CPU);

a second memory in a Field-Programmable Gate Array (FPGA) that stores therein data that is formed of a plurality of bits, the second memory being a memory in which a failure easily occurs more than the first memory; and a processor connected to the first and second memories, wherein the processor reads the data from the second memory, performs bit inversion on the plurality of bits to generate bit inverted data in which a value of each of the bits is inverted, writes the bit inverted data in the first memory at a first time, writes the bit inverted data in the second memory at the first time, reads the bit inverted data from the first memory at a second time that is later than the first time, reads the bit inverted data from the second memory at the second time, compares first data that is the bit inverted data that is read from the first memory at the second time and second data that is the bit inverted data that is read from the second memory at the second time, and determines whether a failure is present in the second memory based on a comparison between the first data and the second data.

2. The data processing apparatus according to claim 1, wherein the processor determines that a failure is absent in the second memory when a value of the first data and a value of the second data are the same, and determines that a failure is present in the second memory when the value of the first data and the value of the second data are different.

3. The data processing apparatus according to claim 1, wherein the processor determines whether a failure is present in the second memory based on a comparison between the first data and the second data without first detecting an error in the data using an error correction code (ECC) and without subsequently restoring an original data value to the memory.

4. The data processing apparatus according to claim 1, wherein the data is detected data that indicates a value detected by a detector that is connected to the data processing apparatus.

5. A memory failure determination method implemented by a processor, the memory failure determination method comprising:

reading data that is formed of a plurality of bits from a second memory, the second memory being in a Field-Programmable Gate Array (FPGA) that stores therein data that is formed of the plurality of bits, the second memory being a memory in which a failure easily occurs more than a first memory, the first memory being in a central processing unit (CPU);

performing bit inversion on the plurality of bits to generate bit inverted data in which a value of each of the bits is inverted;

writing the bit inverted data in the first memory at a first time;

writing the bit inverted data in the second memory at the first time;

reading the bit inverted data from the first memory at a second time that is later than the first time;

reading the bit inverted data from the second memory at the second time;

comparing first data and second data, the first data being the bit inverted data that is read from the first memory at the second time, the second data being the bit inverted data that is read from the second memory at the second time; and determining whether a failure is present in the second memory based on a comparison between the first data and the second data.

6. A non-transitory computer readable recording medium having stored therein a memory failure determination program that causes a computer to execute a process, the process comprising:

reading data that is formed of a plurality of bits from a second memory, the second memory being in a Field-Programmable Gate Array (FPGA) that stores therein data that is formed of the plurality of bits, the second memory being a memory in which a failure easily occurs more than a first memory, the first memory being in a central processing unit (CPU);

performing bit inversion on the plurality of bits to generate bit inverted data in which a value of each of the bits is inverted;

writing the bit inverted data in the first memory at a first time;

writing the bit inverted data in the second memory at the first time;

reading the bit inverted data from the first memory at a second time that is later than the first time;

reading the bit inverted data from the second memory at the second time;

comparing first data and second data, the first data being the bit inverted data that is read from the first memory at the second time, the second data being the bit inverted data that is read from the second memory at the second time; and determining whether a failure is present in the second memory based on a comparison between the first data and the second data.

* * * * *